United States Patent
Hoarau et al.

(10) Patent No.: US 9,235,359 B2
(45) Date of Patent: Jan. 12, 2016

(54) PRINT SERVICE PROVIDER RISKS APPLIED TO DECISION MAKING

(75) Inventors: Eric Hoarau, San Francisco, CA (US); Jun Zeng, Sunnyvale, CA (US); Giordano B. Beretta, Palto Alto, CA (US); I-Jong Lin, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/347,273

(22) PCT Filed: Oct. 31, 2011

(86) PCT No.: PCT/US2011/058630
§ 371 (c)(1),
(2), (4) Date: Mar. 26, 2014

(87) PCT Pub. No.: WO2013/066298
PCT Pub. Date: May 10, 2013

(65) Prior Publication Data
US 2014/0285848 A1    Sep. 25, 2014

(51) Int. Cl.
*G06F 15/00* (2006.01)
*G06F 3/12* (2006.01)
*G06K 15/00* (2006.01)
*G06Q 10/06* (2012.01)

(52) U.S. Cl.
CPC ............ *G06F 3/1203* (2013.01); *G06F 3/1237* (2013.01); *G06Q 10/0635* (2013.01); *G06F 3/121* (2013.01); *G06F 3/1229* (2013.01); *G06F 3/1273* (2013.01); *G06F 3/1275* (2013.01); *G06F 3/1282* (2013.01)

(58) Field of Classification Search
CPC .......... G06Q 10/0633; G06Q 10/0635; G06Q 10/06375; G06N 3/10
See application file for complete search history.

(56) References Cited

U.S. PATENT DOCUMENTS

| | | | |
|---|---|---|---|
| 7,148,985 B2 | 12/2006 | Christodoulou et al. | |
| 7,542,155 B2 | 6/2009 | Paskalev et al. | |
| 7,548,335 B2 | 6/2009 | Lawrence et al. | |
| 7,797,189 B2 | 9/2010 | Rai et al. | |
| 2003/0020942 A1* | 1/2003 | Teres | G06K 15/00 358/1.14 |
| 2005/0027486 A1* | 2/2005 | Kitada | G06F 3/1207 702/185 |
| 2005/0065830 A1 | 3/2005 | Duke et al. | |
| 2006/0227354 A1* | 10/2006 | Farrell et al. | 358/1.13 |
| 2006/0265201 A1* | 11/2006 | Martin | G06Q 10/06 703/6 |
| 2007/0250335 A1* | 10/2007 | Hodges et al. | 705/1 |
| 2007/0280706 A1* | 12/2007 | Yasukawa et al. | 399/8 |
| 2010/0094594 A1 | 4/2010 | Yamashita et al. | |
| 2010/0271656 A1* | 10/2010 | Morales | G06F 3/1217 358/1.15 |
| 2010/0278578 A1 | 11/2010 | Yamada | |
| 2011/0004419 A1* | 1/2011 | Ue et al. | 702/34 |

FOREIGN PATENT DOCUMENTS

| | | |
|---|---|---|
| JP | 2008-213186 | 9/2008 |
| JP | 2008-260162 | 10/2008 |
| KR | 10-2010-0012995 | 2/2010 |

\* cited by examiner

*Primary Examiner* — Thomas Lett
(74) *Attorney, Agent, or Firm* — Fletcher Yoder

(57) ABSTRACT

A system that generates risk values for a print service provider. The print service provider may calculate probabilities of an event occurring, calculate the effect that the given event will have on the print service provider, and determine various risks associated with calculations. These risks may then be utilized to determine overall operational strategies for the print service provider when compared to threshold risk levels for the print service provider.

16 Claims, 3 Drawing Sheets

PRINT SERVICE PROVIDER RISKS APPLIED TO DECISION MAKING

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Despite the onset of the "electronic age," there is still significant demand for print products. Indeed, commercial print often may have annual retail sales totaling more than $700 billion. Print service providers (PSPs) fulfill the demand for print products by printing a vast array of print products, such as photographs, brochures, school course materials, periodicals, books, advertisements, and/or product packaging. Once a job order is released to the PSP floor for production, it goes through four stages of production (Pre-press, Press, Post-Press, and Shipping.) As automated gathering of process information through each of these stages increases, information relating to each stage of production becomes more readily available. Accordingly, there is a need to develop systems and techniques to utilize this information to allow for more efficient processing of print jobs.

DETAILED DESCRIPTION OF SPECIFIC EMBODIMENTS

One or more exemplary embodiments of the present invention be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Technical effects of the present disclosure include analyzing and predicting risks associated with various print jobs to be fulfilled by a print service provider. Risks, according to their impact and remedy, may be classified and the occurrence of risk events may be functions of current and historical (i.e., memory) states of the processes of a print service provider. In addition, as the job type and fulfillment path for various print service providers can vary widely, each job type has its unique characteristics that will influence acceptable outcomes at a particular PSP. Similarly, resources (e.g., workers, machines, etc.) themselves can have their own behavior depending on the type of job they are processing. Each of these elements may influence risks of accepting certain printing jobs, as well as the overall risk threshold of a particular print service provider.

Figure 1:
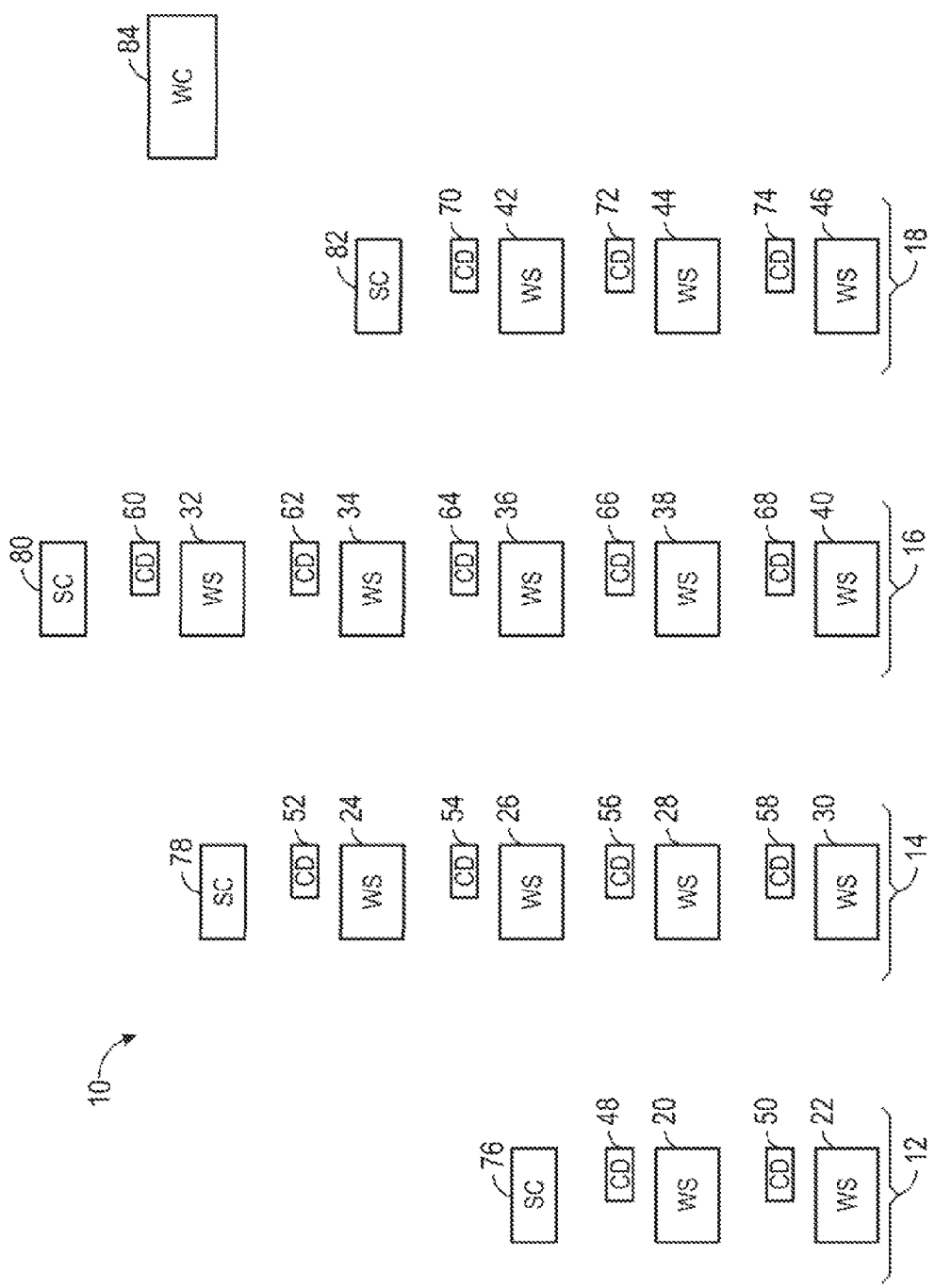
FIG. 1 illustrates a block diagram of a production floor for a print service provider (PSP) in accordance with an embodiment.

Turning now to the drawings and referring first to FIG. 1, an embodiment of a print service provider (PSP) 10. Specifically, the PSP 10 may be, for example, a print shop or other printing location that prints brochures, school course materials, periodicals, books, advertisements, product packaging, and/or other types of on-demand printing jobs. The PSP 10 may be organized into four basic stations, each with a specific role that allows for a print job to be fulfilled. These stations of the PSP 10 may include a pre-press station 12, a press station 14, a post-press station 16, and a shipping station 18. Tasks such as inspecting incoming print jobs for errors, editing incoming print jobs for accuracy, creating proofs, and coordinating production of the print jobs may be performed in the pre-press station 12 of the PSP 10.

Subsequent to being received at the pre-press station 12, a print job may be transferred to the press station 14. At the press station 14, the print job may be printed. To complete the printing of a print job, tasks performed at the press station 14 may include, for example (depending on the material to be printed and the devices available to complete the printing), preparing lithographic (offset) plates, flexographic presses, letterpresses, intaglio printing processes (e.g., rotogravure printing), hybrid machines, such as ink-jet over silk screen or intaglio over gravure machines, digital presses (e.g., an indigo digital press from Hewlett-Packard Company) and/or industrial printers (e.g., a Scitex press from Hewlett-Packard Company) for printing the print job, loading particular paper and/or ink, and offloading printed material. Subsequent to the print job being printed in the press station 14, the printed material for the print job may be transported to the post-press station 16.

At the post-press station 16, the printed material for a given print job may undergo additional processing. For example, the printed material may be cut, collated, and/or bound at the post-press station 16 (depending on the requirements of a given print job). That is, the print job may be finished (i.e., placed into final form) at the post-press station 16. Subsequent to the print job being finished at the post-press station 16, the print job is transported to the shipping station 18, whereby the finished print job may be, for example, packed, labeled, and/or shipped to a customer.

Additionally, each of the stations 12, 14, 16, and 18 of the PSP 10 may include various workstations at which the various tasks of the stations 12, 14, 16, and 18 may be performed. For example, the pre-press station 12 may include, for example, workstations 20 and 22. Each of workstations 20 and 22 may include or may share, for example, an electronic device, such as a desktop computer, a notebook computer, a handheld device (e.g., a portable phone), or a tablet computer, to aid in performing the various tasks undertaken in pre-press station 12. Similarly, the press station 14 may include, for example, workstations 24, 26, 28, and 30. Workstations 24, 26, 28, and 30 may each include, for example, a black and white printer, a color printer, a continuous feed printer, or another printer. Post-press station 16 may include, for example, workstations 32, 34, 36, 38, and 40. Each of workstations 32, 34, 36, 38, and 40 may include, for example. a cutter for cutting printed material, a binder for binding printed material, or a collator for collating printed material. Additionally, it is envisioned that each of the workstations 32, 34, 36, 38, and 40 may include a device that would combine one or more of the cutter, binder, and collator into a single device. Finally, shipping station 18 may include, for example, workstations 42, 44, and 46. Workstations 42, 44, and 46, each may include or may share, for example, an electronic device, such as a desktop computer, a notebook computer, a handheld device (e.g., a portable phone), or a tablet computer, as well as one or more packing machines to aid in performing the various tasks undertaken in the shipping station 18. In one embodiment, one or more sensors may be included in or adjacent to stations 12, 14, 16, and 18 of the PSP 10 such that the sensors may collect information relating to the various tasks undertaken in the stations 12, 14, 16, and 18.

Each of the each of the individual workstations 20, 22, 24, 26, 28, 30, 32, 34, 36, 38, 40, 42, 44, and 46 (collectively referred to hereafter as workstations 20-46) may also have an respective progress capture device 48, 50, 52, 54, 56, 58, 60, 62, 64, 66, 68, 70, 72, and 74 (collectively referred to hereafter as progress capture devices 48-74) associated therewith. Moreover, each of the progress capture devices 48-74 may operate to capture information related to progress of a print job as it progresses through the PSP 10. These progress capture devices may include image capture devices, a radio frequency identification (RFID) scanner, a bar code scanner, a near field communicator (NFC), or another device able to detect, for example, an indicator assigned to a particular print job to track progress of tasks and/or print jobs through the various stations 12, 14, 16, and 18 of the PSP 10. In another embodiment, progress capture devices 48-74 (e.g., sensors) may also capture the status and health of the machines at the stations 12, 14, 16, and 18 and/or various actions from the workers at those stations 12, 14, 16, and 18.

In one embodiment, progress capture devices 48-74 may be networked devices. For example, progress capture devices 48 and 50 may be connected via wires or wirelessly to a pre-press station controller 76 in the pre-press station 12, progress capture devices 52, 54, 56, and 58 may be connected via wires or wirelessly to a press station controller 78 in the press station 14, progress capture devices 60, 62, 64, 66, and 68 may be connected via wires or wirelessly to a post-press station controller 80 in the post-press station 12, and progress capture devices 70, 72, and 74 may be connected via wires or wirelessly to a shipping station controller 82 in the shipping station 18.

Each of the pre-press station controller 76, the press station controller 78, the post-press station controller 80, and the shipping station controller 82 (collectively referred to hereafter as station controllers 76-82) may be for example, an electronic device, such as a server tower, a desktop computer, a notebook computer, a handheld device (e.g., a portable phone), or a tablet computer used to monitor the progress of one or more print jobs for each of the respective stations 12, 14, 16, and 18 with which the pre-press station controller 76, the press station controller 78, the post-press station controller 80, and the shipping station controller 82 is associated. Additionally, each of the station controllers 76-82 may be networked devices and connected, via wired or wirelessly, to workflow controller 84.

Workflow controller 84 may be for example, an electronic device such as a server tower, a desktop computer, a notebook computer, a handheld device (e.g., a portable phone), or a tablet computer used to monitor the progress of one or more print jobs for one or more of the respective stations 12, 14, 16, and 18. The workflow controller may also dynamically adjust the workflows of at least some of the print jobs passing through the PSP 10 to account for changes of circumstances on the production floor of the PSP 10, such as one or more of the workstations 20-46 breaking down, performing slowly, or otherwise impeding successful completion of a printing job. In another embodiment, each of progress capture devices 48-74 may be directly connected, either via wires or wirelessly, to the workflow controller 84 in addition to, or instead of, being connected to the respective station controllers 76-82. Additionally, it should be noted that communications between the progress capture devices 48-74 and the respective station controllers 76-82, communications between the station controllers 76-82 and the workflow controller 84, and/or communications between the progress capture devices 48-74 and the workflow controller 84 may take place, for example, utilizing the job definition format (JDF) and/or job messaging format (JMF) standards. In this manner, results of the status of various print jobs may be transmitted, via a wired or wireless connection, to the station controllers 76-82, and/or the workflow controller 84 from the progress capture devices 48-74 so that real time monitoring of any print job may be accomplished. Additionally or alternatively, any additional relevant operation information, such as machine status, quality, etc., may be captured by the capture devices 48-74.

Figure 2:
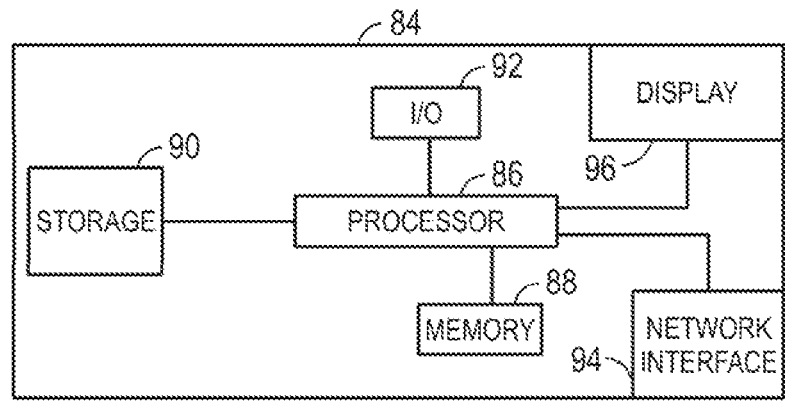
FIG. 2 illustrates a block diagram of an embodiment of a workflow controller of the PSP of FIG. 1.

Turning next to FIG. 2, a detailed schematic of the workflow controller 84 is illustrated. However, it should be noted that the elements of the workflow controller 84 may also be found in each of the station controllers 76-82. The various functional blocks of the workflow controller 84 may include hardware elements, processor-executable instructions, or a combination of both. Moreover, it is noted that the blocks illustrated in FIG. 2 are intended to represent only one example of a particular implementation of the workflow controller 84, and the illustrated device may include more or fewer components, as desired. For example, part of the functions performed by the workflow controller 84 may be processed, for example, offsite via cloud computing, such that the risk analysis can also be performed via cloud computing.

The workflow controller 84 may include processors 86 and/or other data processing circuitry that may be operably coupled to memory 88 and storage 90 to execute instructions for carrying out the presently disclosed techniques. These instructions may be encoded in programs that may be executed by the processors 86. The instructions may be stored in any suitable article of manufacturer that includes at least one tangible non-transitory, computer-readable medium that at least collectively stores these instructions or routines, such as the memory 88 or the storage 90.

The memory 88 and the storage 90 of the workflow controller 84 may include, for example, random-access memory, read-only memory, rewritable memory, hard drive(s), and/or optical discs. The workflow controller 84 may also include input/output (I/O) ports 92 for connection to external devices (e.g., a printer, mouse, keyboard, etc.) as well as a network interface 94. The network interface 94 may provide communication via a personal area network (PAN) (e.g., Bluetooth), a local area network (LAN) (e.g., Wi-Fi), a wide area network (WAN) (e.g., 3G or LTE), a near field communication device (NFC), a physical connection (e.g., an Ethernet connection), and/or the like. Through the network interface 94, the workflow controller 84 may be part of a communication network across which data related to various print jobs in the PSP 10 may be transmitted. Additionally, in one embodiment, the workflow controller 84 may include a display 96 for displaying, for example, a graphical user interface (GUI) and/or data related to communications from the progress capture devices 48-74.

Figure 3:
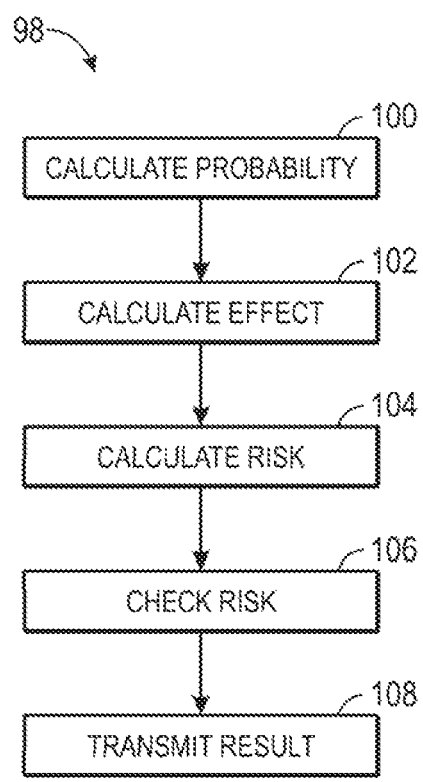
FIG. 3 is a flow chart illustrating the operation of the workflow controller of FIG. 2.

FIG. 3 illustrates a flow diagram 98 for the operation of the workflow device 84 (or any of the station controllers 76-82) in determining risks and plant utilization for a given PSP 10. It should be noted that the steps of flow diagram 98 may be implemented as a computer or software program (e.g., code or instructions) that may be executed by the processors 86 to execute one or more of the steps 100-108 of the flow diagram 98. Additionally, the program (e.g., code or instructions) may be stored in any suitable article of manufacturer that includes at least one tangible non-transitory, computer-readable medium that at least collectively stores these instructions or routines, such as the memory 88 or the storage 90.

Flow diagram 98 shows an example of generating one or more risk indicators and utilizing those risk indicators help quantify the potential risk a process or job type might cause to the production under a given current condition. Such an indicators may be valuable for planning (e.g., equipment purchase and resource allocation) for the PSP 10, for negotiating contracts for service (e.g., service level agreements [SLAs]), for job scheduling (e.g., balancing risk across machines in various stations 12, 14, 16, and 18 of the PSP 10), and/or for monitoring (e.g., determining the health of workstations 20-46 current/projected conditions). Moreover, determination of risk may allow for forecasting of potential lost profits if the determined risks are realized.

In step 100, the probability of an event occurring is calculated, for example, by the workstation 84. Calculation (i.e., determination) of the probability of an event occurring may include review and application of historical data of a particular event (e.g., a particular failure) occurring with respect to a particular print job. Calculating the probability of an event occurring may also include other factors such as experience levels of workers on a given station (e.g., station 16) and the experience for a given print job to be fulfilled. That is, as the experience level of a worker increases, there may be a corresponding decrease in the probability of a failure. Additionally, one or more test runs may be performed and included in the calculation of the probability of an event (e.g., one or more particular employees may perform a particular set of tasks related to a print job). This information may be utilized in conjunction with historical data related to a particular print task.

In step 102, the effect to the PSP of a particular event may be calculated, for example, by the workstation 84. This calculation in step 102 may include simulating various problems (fault events) that may occur during a given print job. That is, various fault events may be simulated, whereby the events include problems of differing severities and/or continue for various durations of time. These simulations may also include as a factor the operational characteristics of the PSP 10 (e.g., the total number of workstations 20-46 and or the total number of workstations in a given station at which a fault may occur).

The results of step 100 and 102 may be utilized to calculate a risk value for a given print job for a particular PSP 10 in step 104. It should be noted that each of step 100 and 102 may be calculated concurrently or sequentially. However, in one embodiment, each of steps 100 and 102 are performed prior to step 104 being undertaken. Calculation of a risk factor in step 104 may determine the risk for the system (e.g., on one or more of the stations 12, 14, 16, and 18 and/or the PSP 10 overall) based on the job type to be performed. That is, calculation of the risk factor in step 104 may generally include, for example, failure statistics of a job type for each process which can be determined from a number of sources including historical data, worker's knowledge, experience, reliability, and/or ability, and/or from test-runs performed (i.e., the calculation determined in step 100). Calculation of the risk factor in step 104 may also generally include, for example, the effect of a failure on the surrounding components, the fulfillment path, and the system, as well as a duration term to allow for consideration of any cross-linking effect of shared resources (e.g., one or more of the stations 12, 14, 16, and 18). Other examples of the calculation of the risk factor may include reduction in brand value of a PSP, penalties, or additional relevant charges generated when one or more jobs are late or if quality levels stipulated in a contract are not met, as well as a potential bonuses when, for example, jobs are delivered ahead of schedule.

In one embodiment, a calculation of an individual risk value in step 104 (for a single process "n") may be represented as:

$$Risk_{process\ n} = Probability_{event} * Effect_{event}$$

whereby the Probability$_{event}$ is determined in step 100 and the Effect$_{event}$ is determined in step 102 as the impact of an event (e.g., severity) times the duration of the event (e.g., length of time of the event). Furthermore an overall risk value, e.g., a risk fulfillment path, that indicates the maximum total amount of risk for a given set of events across multiple processes, may be represented as:

$$Risk_{fulfillment\ path} = \max\{Risk_{process\ 1}, Risk_{process\ 2}, \ldots, Risk_{process\ n}\}$$

That is, the overall risk value for set of processes for a given print job may be calculated in step 104 as the Risk$_{fulfillment\ path}$. This overall risk value and/or the individual risk value may be utilized in step 106.

Step 106 includes checking the risk values determined in step 104 against an overall risk strategy. This overall risk strategy may include, for example, an overall acceptable risk value for a given print job (based, for example on a risk strategy that may include a determination of, for example, profits to be made for processing a particular print job versus the chance of failure of one or more elements due to the job being processed). Thus, the overall risk value calculated in step 104 may be compared against the risk strategy for the PSP 10 in step 106. Additionally, each of the individual risk values calculated in step 104 may be checked against individual risk strategies for each of the stations 12, 14, 16, and 18 of the PSP 10. That is, step 106 may determine whether a given task is high risk, at a tolerable level of risk, or at a low risk for failure. As will be discussed below, this information may be used to redistribute resources, such as workers, to affect the risk for particular stations 12, 14, 16, and 18 of the PSP 10.

Figure 4:
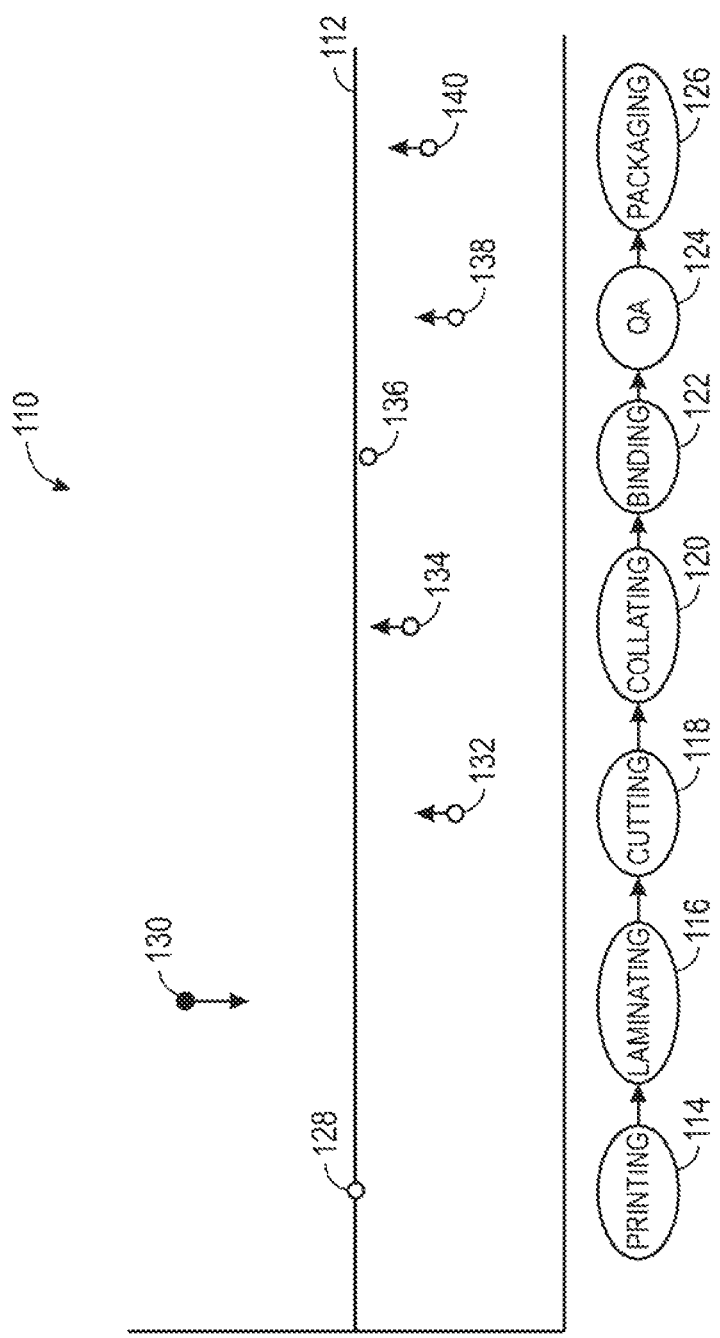
FIG. 4 is screenshot of a display of the workflow controller of FIG. 2.

In step 108, the results of step 106 may be transmitted for use by one or more users. For example, the results may be utilized to formulate proposed changes to the overall risk strategy of the PSP 10 that may be reviewed for approval by management. The results of step 106 may additionally or alternatively be transmitted to a scheduling or planning algorithm to add a given process to a schedule of jobs to be performed. Furthermore, the results of step 106 may sent to a visualization platform, for example, a GUI far display on display 96 of the workstation 84 or another display. FIG. 4 illustrates one example of a screenshot of a display that may include the information from step 106 transmitted in step 108.

FIG. 4 illustrates a screenshot 110 of a display, for example display 96, which includes risk information transmitted in step 108 of flowchart 98. Specifically, screenshot 110 includes a line 112 that represents the maximum overall acceptable risk value for a given print job (based, for example on a risk strategy that may include a determination of, for example, profits to be made for processing a particular print job versus the chance of failure of one or more elements due to the job being processed). Screenshot 110 also includes individual risk values that have been calculated for various processes associated with a given print job. For example, processes may include a printing process 114, a laminating process 116, a cutting process 118, a collating process 120, a binding process 122, a quality assurance process 124, and a packaging process 126 (which may be collectively referred to as processes 114-126). The screenshot 110 also includes individual risk values 128-140 that each correspond to the risk values associated with one of the processes 114-126. As illustrated, the risk values 128-140 may be near the line 112 (e.g., printing process risk value 128 and binding process risk value 136), above the line 112 (e.g., laminating process risk value 130), or below line 112 (e.g., cutting process risk value 132, collating process risk value 134, quality assurance process risk value 138, and packaging process risk value 140). This information may be utilized by a user, for example, a floor manager of the PSP 10. For example, an experienced worker may be moved from the cutting process 118, the collating process 120, the binding process 122, and/or the quality assurance process 124 to the laminating process 116 in an effort to reduce risk of a fault to a level at or below line 112. In this manner, floor managers may have an opportunity to quantitatively analyze various printing jobs and their staffing for these jobs. Moreover, any strategy (e.g., adding more labor, more machines, changing throughput, changing ordering or composition of the jobs, switching machines or worker between stations to a more reliable one) may be useful to implement if it will reduce risk. Additionally, if risk is found to be too low, there may be an opportunity to optimize the operations by reducing any overcapacity in the process and sending it to another station (e.g., as the resources in a manufacturing plant are finite, it is important to assign them to each processes to balance the risk across all the processes.)

The determinations of risk outlined above for various print jobs may be utilized, for example, to maintain a near uniform level of risk across its processes (i.e., attempt to adjust risk levels for a given project towards a maximum allowable risk level illustrated by line 112 of FIG. 4). Moreover, this maximum allowable risk level (represented by line 112 of FIG. 4) may be derived from production and capacity planning exercises. Additionally, resulting the risk indicator of the fulfillment path can be used at different levels of the operation to inform operation policies. That is, while expectation of the factory performance (both throughput and quality of services) defines the maximum risk level for a PSP 10, a higher risk level can potentially lead to either higher profit or loss, while a low number may indicate stability, but at a potential cost of a lower profit margin. This information may be utilized to satisfy both healthy profitability and sufficient slack to handle rare and unexpected events. Thus, for example, during the SLA negotiations, the price of an incoming job may factor in the risk it will add to the system of the PSP 10.

Additionally, determination of risk may inform job scheduling so that a scheduling algorithm reviews a set of properties for a set of jobs and allocate various workstations 20-46 so that risk is balanced across all the workstations 20-46. Thus, for example, when two possible fulfillment paths are acceptable, the path with the lower risk may be chosen. Additionally, this may be accomplished by providing visual feedback, for example, as illustrated in FIG. 4. In this manner, a floor manager can identify critical paths and exercise options to mitigate the risk include shifting or allocating resources to the problem area and adjusting the specific process rate. In this manner, calculated risk indicators may be used in setting operation policies, planning production expansion, and scheduling and monitoring jobs in real-time ion a PSP 10.

Furthermore, it should be noted that the above discussed techniques may be applied to a network of PSPs 10. That is, in addition to calculating risk for the operation of a particular PSP 10 and allocating resources therein, the risk calculation may be made for multiple PSPs 10 (e.g., a network of PSPs) in a set geographical region, such as a city, a county, a state, a group of states, a country, or a set of countries. That is, determination of risk across the network of PSPs 10 may inform job scheduling so that a scheduling algorithm reviews a set of properties for a set of jobs and allocates the jobs across the PSPs 10 in the selected PSP 10 network so that risk is balanced across all the PSPs 10 in the network. In this manner, calculated risk indicators may be used in selecting which PSPs 10 to utilize to complete various jobs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   a network interface configured to receive information related to activity at a print workstation of a print service provider, wherein the workstation is configured to perform on a particular print job a set of processes comprising a pre-press station process, a press station process, a post-press station process, and a shipping station process; and
   a processor configured to:
      utilize the received information to determine for each of the processes a respective probability of a respective event type occurring at the print workstation and calculate a respective risk to operation of the print service provider based on the respective probability of the respective event type occurring at the print workstation;
      determine, based on the respective risk to the operation of the print service provider for each respective event type, an overall risk in accepting the particular print job by the print service provider; and
      in response to determining that the overall risk in accepting the particular print job by the print service provider is acceptable, causing the particular print job to be fulfilled by the print service provider by scheduling the particular print job for fulfillment by the print service provider based on the respective risk to the operation of the print service provider for each respective event type.

2. The electronic device of claim 1, wherein the processor is configured to simulate an effect on the print service provider based on the event.

3. The electronic device of claim 2, wherein processor is configured to simulate the effect on the print service provider as a measure of the intensity, duration, and cost of the event.

4. The electronic device of claim 2, wherein processor is configured to determine the risk to operation of the print service provider based on the effect on the print service provider.

5. The electronic device of claim 1, wherein processor is configured to determine whether the risk to operation of the print service provider exceeds a threshold risk value.

6. The electronic device of claim 5, wherein the processor is configured to transmit an indication to adjust an operation of the print service provider based on whether the risk to operation of the print service provider exceeds a threshold risk value.

7. The electronic device of claim 5, comprising a display configured to receive an indication of the threshold risk value from the processor and display a threshold risk value indicator associated with the indication of the threshold risk value.

8. The electronic device of claim 7, wherein the display is configured to receive an indication of an individual risk value from the processor and display an individual risk value indicator associated with the indication of the individual risk value.

9. The electronic device of claim 1, wherein processor is configured to output an indication of the risk calculated to be utilized in generating service level agreements involving the print service provider or planning or scheduling print jobs to be completed by the print service provider.

10. The electronic device of claim 1, wherein the processor is further configured to schedule the particular print job for fulfillment by the print service provider by:
- determining that more than one workflow path through the print service provider is able to fulfill the particular print job;
- selecting a given workflow path through the print service provider that has an associated minimum risk of any workflow path through the print service provider that is able to fulfill the particular print job; and
- causing the particular print job to be fulfilled by the print service provider through the given workflow selected.

11. An article of manufacture comprising:
- at least one tangible, machine-readable medium at least collectively storing processor-executable instructions, the instructions comprising:
- instructions to determine, for each of a plurality of print service provider processes comprising a pre-press station process, a press station process, a post-press station process, and a shipping station process, a probability of an event occurring at a print workstation of a print service provider to perform a particular print job;
- instructions to determine, for the event for each print service provider process, a respective risk to operation of the print service provider based on the probability of the event occurring;
- instructions to determine an overall risk in accepting the particular print job by the print service provider, based on the respective risk to the operation of the print service provider for the event for each print service provider process; and
- instructions to schedule the particular print job for fulfillment by the print service provider based on the respective risk to the operation of the print service provider for the event for each print service provider process, if the overall risk in accepting the particular print job by the print service provider is acceptable.

12. The article of manufacture of claim 11, comprising instructions to compare the risk to the at least one operational characteristic of the print service provider against a threshold risk value.

13. The article of manufacture of claim 12, comprising instructions to transmit an indication to adjust an operation schedule of the print service provider based on whether the risk to at least one operational characteristic of the print service provider exceeds the threshold risk value.

14. The article of manufacture of claim 12, comprising instructions to transmit an indication of the threshold risk value to a display.

15. The article of manufacture of claim 12, comprising instructions to calculate an individual risk value for an individual process in the print service provider.

16. The article of manufacture of claim 15, comprising instructions to transmit an indication of the individual risk value to a display.

* * * * *

UNITED STATES PATENT AND TRADEMARK OFFICE
CERTIFICATE OF CORRECTION

| | | |
|---|---|---|
| PATENT NO. | : 9,235,359 B2 | Page 1 of 1 |
| APPLICATION NO. | : 14/347273 | |
| DATED | : January 12, 2016 | |
| INVENTOR(S) | : Eric Hoarau et al. | |

It is certified that error appears in the above-identified patent and that said Letters Patent is hereby corrected as shown below:

Title page, item (75), Inventors, in column 1, line 3, delete "Palto" and insert -- Palo --, therefor.

Signed and Sealed this
Thirty-first Day of May, 2016

Michelle K. Lee
*Director of the United States Patent and Trademark Office*